United States Patent
Ferguson et al.

(10) Patent No.: US 11,743,167 B2
(45) Date of Patent: *Aug. 29, 2023

(54) SYSTEM AND METHOD FOR NEXT HOP BGP ROUTING IN A NETWORK

(71) Applicant: Level 3 Communications, LLC, Broomfield, CO (US)

(72) Inventors: Francis Ferguson, Aurora, CO (US); Eric Osborne, Sutton, MA (US); Clyde David Cooper, III, Louisville, CO (US); Brent W. Smith, Arvada, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/976,274

(22) Filed: Oct. 28, 2022

(65) Prior Publication Data

US 2023/0046362 A1    Feb. 16, 2023

Related U.S. Application Data

(63) Continuation of application No. 17/374,063, filed on Jul. 13, 2021, now Pat. No. 11,489,755, which is a
(Continued)

(51) Int. Cl.
*H04L 45/02* (2022.01)
*H04L 45/122* (2022.01)
(Continued)

(52) U.S. Cl.
CPC .......... *H04L 45/02* (2013.01); *H04L 12/4625* (2013.01); *H04L 45/04* (2013.01);
(Continued)

(58) Field of Classification Search
CPC ....... H04L 45/02; H04L 45/04; H04L 45/122; H04L 45/22; H04L 45/28; H04L 45/74;
(Continued)

(56) References Cited

U.S. PATENT DOCUMENTS 6,963,575 B1   11/2005   Sistanizadeh et al.
7,624,226 B1   11/2009   Venkatachary
(Continued)

OTHER PUBLICATIONS

International Preliminary Report on Patentability, dated Aug. 13, 2019, Int'l Appl. No. PCT/US18/017254, Int'l Filing Date Feb. 7, 2018; 8 pgs.
(Continued)

*Primary Examiner* — Candal Elpenord

(57) ABSTRACT

Aspects of the present disclosure involve systems for providing multiple egress routes from a telecommunications network for a client of the network. In general, the system provides for a client of the network to receive intended packets of information through multiple connections to the network such that load balancing and failover services for traffic to the customer are provided. The process and system allow for telecommunications network to utilize a common next-hop value of announced border gateway protocol (BGP) routes to advertise multiple routes to reach a destination customer network or address. By utilizing a common next-hop value in the announced BGP information, the devices of the network may load balance communication packets to the destination customer or address among the multiple egress locations from the network, as well as providing fast failover to alternate routes when a failure at the network or customer occurs.

20 Claims, 5 Drawing Sheets

Related U.S. Application Data continuation of application No. 16/821,629, filed on Mar. 17, 2020, now Pat. No. 11,070,460, which is a continuation of application No. 16/398,034, filed on Apr. 29, 2019, now Pat. No. 10,601,699, which is a continuation of application No. 15/891,047, filed on Feb. 7, 2018, now Pat. No. 10,277,499.

(60) Provisional application No. 62/510,912, filed on May 25, 2017, provisional application No. 62/455,992, filed on Feb. 7, 2017.

(51) Int. Cl.
| | |
|---|---|
| *H04L 45/00* | (2022.01) |
| *H04L 45/74* | (2022.01) |
| *H04L 47/125* | (2022.01) |
| *H04L 45/28* | (2022.01) |
| *H04L 12/46* | (2006.01) |
| *H04L 12/66* | (2006.01) |

(52) U.S. Cl.
CPC ............ *H04L 45/122* (2013.01); *H04L 45/22* (2013.01); *H04L 45/28* (2013.01); *H04L 45/74* (2013.01); *H04L 47/125* (2013.01); *H04L 12/46* (2013.01); *H04L 12/66* (2013.01)

(58) Field of Classification Search
CPC ..... H04L 12/4625; H04L 12/46; H04L 12/66; H04L 47/125
USPC .................................................. 370/237–238
See application file for complete search history.

(56) References Cited

U.S. PATENT DOCUMENTS

| | | |
|---|---|---|
| 7,630,392 B2 | 12/2009 | Raza |
| 7,787,396 B1 | 8/2010 | Nalawade |
| 9,100,328 B1 | 8/2015 | Atlas |
| 9,444,677 B2 | 9/2016 | Kumar |
| 9,806,949 B2 | 10/2017 | Addanki |
| 9,906,378 B2 | 2/2018 | Lindem, III |
| 2004/0032856 A1 | 2/2004 | Sandstrom |
| 2004/0039840 A1 | 2/2004 | Dispensa |
| 2005/0068968 A1 | 3/2005 | Ovadia |
| 2006/0250964 A1 | 11/2006 | Vasseur |
| 2007/0091794 A1 | 4/2007 | Filsfils |
| 2009/0238188 A1 | 9/2009 | Xu et al. |
| 2010/0008361 A1 | 1/2010 | Guichard |
| 2011/0032843 A1 | 2/2011 | Papp |
| 2011/0142054 A1 | 6/2011 | Scholl et al. |
| 2011/0258257 A1 | 10/2011 | Previdi |
| 2012/0069847 A1 | 3/2012 | Saad |
| 2013/0297824 A1 | 11/2013 | Lan |
| 2014/0237138 A1 | 8/2014 | Xu |
| 2015/0009803 A1 | 1/2015 | Bashandy |
| 2015/0043570 A1 | 2/2015 | Filsfils |
| 2015/0074187 A1 | 3/2015 | Fletcher |
| 2017/0195210 A1* | 7/2017 | Jacob .................... H04L 69/321 |
| 2018/0227212 A1 | 8/2018 | Ferguson et al. |
| 2019/0253338 A1 | 8/2019 | Ferguson et al. |
| 2020/0220801 A1 | 7/2020 | Ferguson |
| 2021/0344585 A1 | 11/2021 | Ferguson |

OTHER PUBLICATIONS

International Search Report and Written Opinion of the International Searching Authority, dated Apr. 12, 2018, Int'l Appl. No. PCT/US18/017254, Int'l Filing Date Feb. 7, 2018; 9 pgs.

* cited by examiner

SYSTEM AND METHOD FOR NEXT HOP BGP ROUTING IN A NETWORK

TECHNICAL FIELD

Embodiments of the present invention generally relate to systems and methods for implementing a telecommunications network, and more specifically for routing packets within a network based on a next-hop value in border gateway protocol (BGP) information that is unique to a gateway, a customer, or a local-customer of the network.

BACKGROUND

Telecommunication networks provide for the transmission of information across some distance through terrestrial, wireless or satellite communication networks. Such communications may involve voice, data or multimedia information, among others. In addition, telecommunication networks often offer features and/or services to the customers of the network that provide flexible and varied ways in which the communications are transmitted over the network. For example, some telecommunication networks provide Internet access to its customers, long distance communication capabilities, high definition audio and/or video communication capabilities, and the like. In other examples, the telecommunication network may be utilized by other networks to provide certain services to customers of the other networks. In this manner, a telecommunication network may provide any number of communication services to the various customers purchasing those services from the network.

To transmit these messages and/or services, many telecommunications networks include a process of announcing routing information to devices within and outside the network that is then re-broadcast or announced to other devices within or outside the network. This routing information generally provides a route or other transmission information to the network devices on how to reach a destination device or address, whether internal or external to the network such that a transmission path from an originating device to a destination device may be created. Through this route announcement process, devices within the telecommunications network receive an understanding of the connectivity of the network through which communication packets may be transmitted. In some instances, however, the route announcement process may cause undesirable issues and inefficiencies for the telecommunications network, especially for communication packets intended for border networks or other customers that connect to the telecommunications network in multiple locations and/or connections.

SUMMARY

One implementation of the present disclosure may take the form of a method for routing a communication through a telecommunications network. The method may include the operations of establishing, utilizing a first network edge device, a border gateway protocol (BGP) session with a first edge device of a border network in communication with the telecommunications network, the BGP session providing first routing information for transmitting communication packets to a destination address through the first network edge device of the border network and receiving, utilizing a second network edge device, second routing information from a second edge device of the border network in communication with the telecommunications network, the second routing information for transmitting communication packets to the destination address through the second network edge device of the border network. The method may further include the operation of transmitting internal BGP information from the first network edge device and the second network edge device to at least one device of the telecommunications network, the internal BGP information comprising the destination address and a group-specific next-hop identifier, the group-specific next-hop identifier utilized by the telecommunications network to transmit communication packets to the border network.

Another implementation of the present disclosure may take the form of a telecommunications network. The network may include a first network edge device in communication with a first border network edge device of a border network, the first network edge device receiving first routing information for transmitting communication packets to a destination address through the first border network edge device of the border network, a second network edge device in communication with a second border network edge device of the border network, the second network edge device receiving second routing information for transmitting communication packets to the destination address through the second border network edge device of the border network, and at least one routing device receiving internal routing information from the first network edge device and the second network edge device, the internal routing information comprising the destination address and a group-specific next-hop identifier, the group-specific next-hop identifier utilized by the telecommunications network to transmit communication packets to the border network.

Yet another implementation of the present disclosure may take the form of a networking device including at least one communication port for receiving routing information associated with a telecommunications network, a processing device, and a computer-readable medium connected to the processing device configured to store information and instructions. When the instructions are executed by the processing device, the networking device is configured to receive internal Border Gateway Protocol (BGP) information from a first network edge device in communication with a first border network edge device of a border network to the telecommunications network and a second border network edge device in communication with a second border network edge device of the border network, the internal BGP information comprising a destination address and a group-specific next-hop identifier utilized by the telecommunications network to transmit communication packets to the border network. The networking device is further configured to select a preferred route through the telecommunications network to the destination address based on the group-specific next-hop identifier received from the first network edge device and the second network edge device and transmit at least one communication packet to the destination address based on the selected preferred route through the telecommunications network.

DETAILED DESCRIPTION

Aspects of the present disclosure involve systems, methods, computer program products, and the like, for providing multiple egress routes from a telecommunications network for a client of the network. In general, the process allows for a client of the network to receive intended packets of information through multiple connections to the network, thereby providing a load balancing and failover services for traffic to the customer. More particularly, the process and system allows for telecommunications network to utilize a common next-hop value or identifier of announced border gateway protocol (BGP) routes to advertise multiple routes to reach a destination customer network or address. By utilizing a common next-hop value or identifier in the announced BGP information, the devices of the network may load balance communication packets to the destination customer or address among the multiple egress locations from the network, as well as providing fast failover to alternate routes when a failure at the network or customer occurs. In some instances, the next-hop value or identifier of the announced BGP information may be shared among ingress points of a gateway of the telecommunications network, common to a particular customer or customer network of the network, or common to a particular customer and ingress locations for a particular customer into the network. Other uses and advantages of a routing based on a next-hop BGP routing information are discussed in more detail below.

Figure 1:
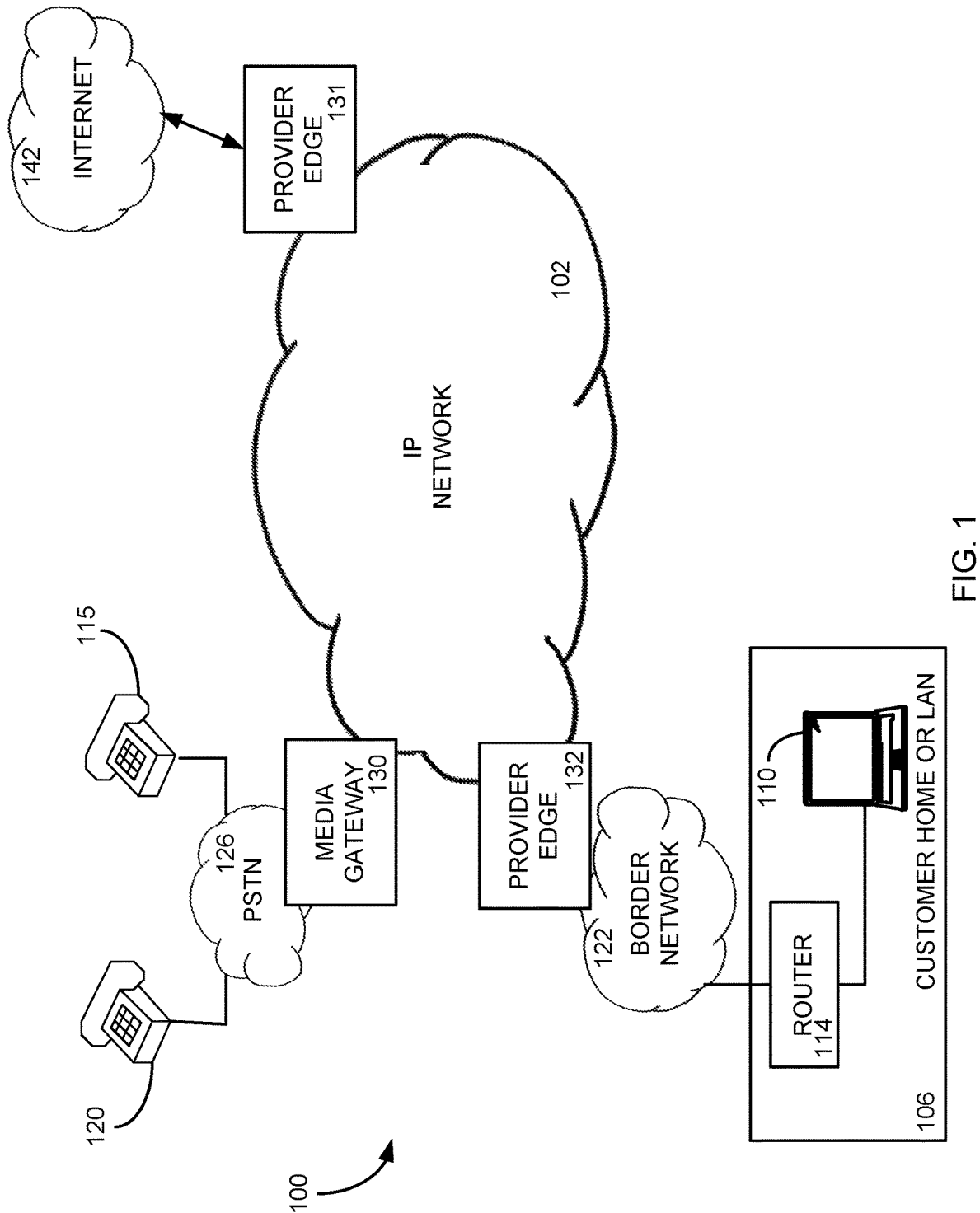
FIG. 1 schematic diagram illustrating an exemplary Internet Protocol (IP) operating environment in accordance with one embodiment.

FIG. 1 illustrates an exemplary operating environment 100 for providing multiple egress points from a telecommunications network for a client of the network. In general, the environment 100 provides for establishing communication sessions between network users and for providing one or more network services to network users. For example, content from a content delivery network (CDN) may be provided to and/or from one or more customers of the network through the operating environment 100 discussed herein. With specific reference to FIG. 1, the environment 100 includes an IP network 102, which may be provided by a wholesale network service provider. However, while the environment 100 of FIG. 1 shows a configuration using the IP network 102; it should be appreciated that portions of the network may include non IP-based routing. For example, network 102 may include devices utilizing time division multiplexing (TDM) or plain old telephone service (POTS) switching. In general, the network 102 of FIG. 1 may include any communication network devices known or hereafter developed.

The IP network 102 includes numerous components such as, but not limited to gateways, routers, and registrars, which enable communication and/or provides services across the IP network 102, but are not shown or described in detail here because those skilled in the art will readily understand these components. More relevant to this description is the interaction and communication between the IP network 102 and other entities, such as the one or more customer home or business local area networks (LANs) 106, where a user of the network will connect with the network.

Customer network 106 can include communication devices such as, but not limited to, a personal computer or a telephone 110 connected to a router/firewall 114. Although shown in FIG. 1 as computer 110, the communication devices may include any type of communication device that receives a multimedia signal, such as an audio, video or web-based signal, and presents that signal for use by a user of the communication device. The communication and networking components of the customer network 106 enable a user at the customer network 106 to communicate via the IP network 102 to other communication devices, such as another customer network 126 and/or the Internet 142. Components of the customer network 106 are typically home- or business-based, but they can be relocated and may be designed for easy portability. For example, the communication device 110 may be wireless (e.g., cellular) telephone, smart phone, tablet or portable laptop computer. In some embodiments, multiple communication devices in diverse locations that are owned or operated by a particular entity or customer may be connected through the IP network 102.

The customer network 106 typically connects to the IP network 102 via a border network 122, such as one provided by an Internet Service Provider (ISP). The border network 122 is typically provided and maintained by a business or organization such as a local telephone company or cable company. The border network 122 may provide network/communication-related services to their customers. In contrast, the communication device 120 accesses, and is accessed by, the IP network 102 via a public switched telephone network (PSTN) 126 operated by a local exchange carrier (LEC). Communication via any of the networks can be wired, wireless, or any combination thereof. Additionally, the border network 122 and PSTN 126 may communicate, in some embodiments, with the IP Network 102 through a media gateway device 130 or provider edge 132, 131. For ease of instruction, only three communication devices 110, 115, 120 are shown communicating with the IP network 102; however, numerous such devices, and other devices, may be connected with the network, which is equipped to handle enormous numbers of simultaneous calls and/or other IP-based communications.

Figure 2:
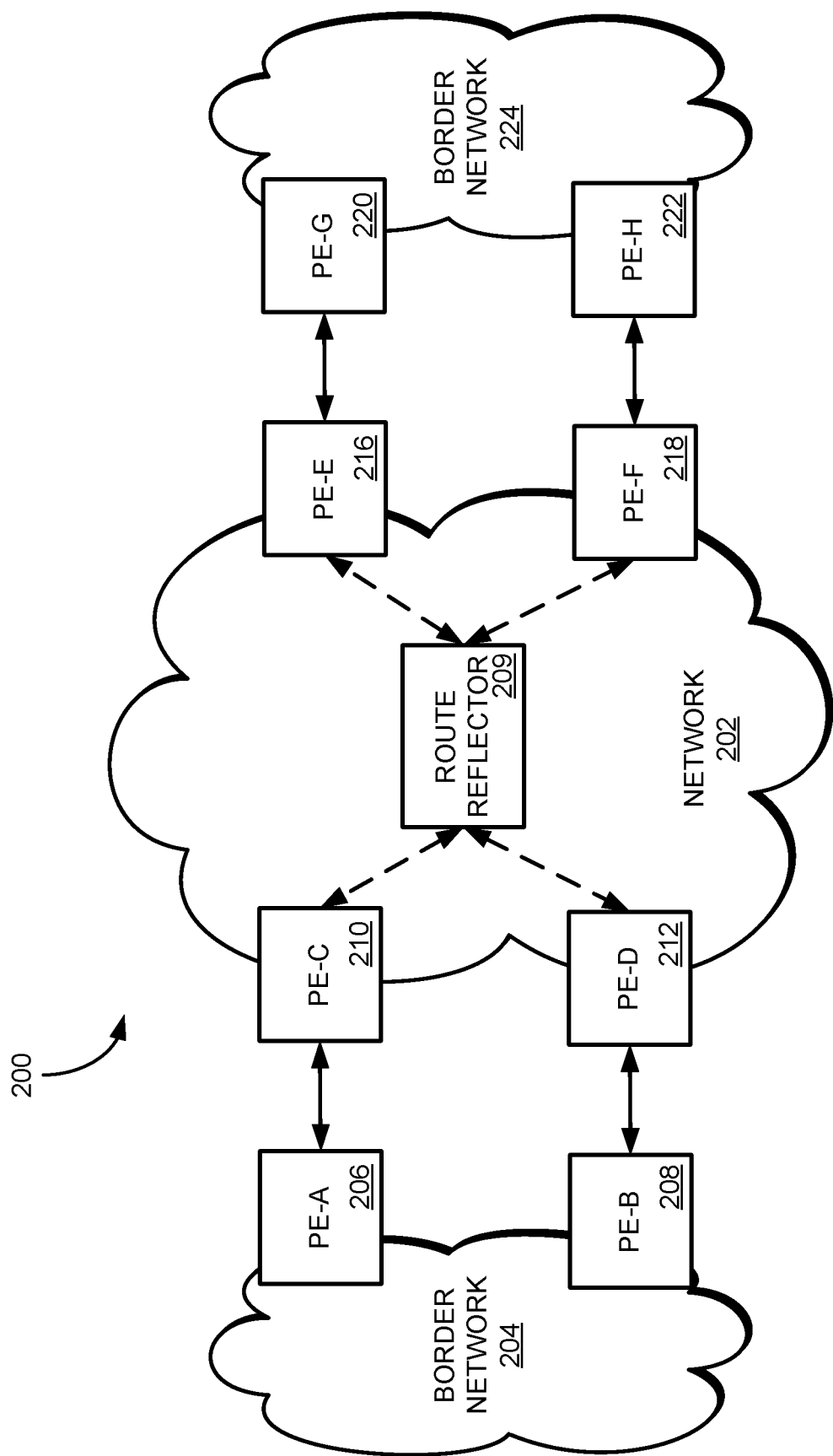
FIG. 2 is a schematic diagram illustrating a network environment to provide multiple routes to a client network through the network environment.

As mentioned above, the telecommunications network 102 may provide an interface to a customer or border network through which the customer or border network connects to the network. In one example, the interface may be a provider edge 132 or other type of edge device. Further, a border network may connect to the telecommunications network through more than one provider edge devices in multiple locations. In particular, FIG. 2 is a schematic diagram illustrating a network environment 200 to provide multiple routes for a client network 204 through the network environment. The telecommunications network 202 of FIG. 2 may be similar to that of FIG. 1 such that the networks may include the same or similar components. Border networks 204, 224 connected to the telecommunications network 202 may utilize the network to send and receive packets of information to/from other customers to the network, as described above.

As shown in FIG. 2, a border network 204 connects to the network 202 through multiple provider edge devices. In particular, border network 204 may include provider edge device A 206 that connects to the network 202 through provider edge C 210 and provider edge device B 208 that connects to the network through provider edge D 212. In addition, border network 224 also connects to the network 202 through one or more provider edge devices. In particular, border network 224 includes provider edge device G 220 that connects to the network 202 through provider edge E 216 and provider edge device H 222 that connects to the network 202 through provider edge F 218. In one example, border network 204 and border network 224 may be for the same customer to the network such that the border networks share the same autonomous system (AS) number identifying the border network to other telecommunications networks. As such, the particular border network 204, 224 may connect to the telecommunications 202 network at multiple ingress/egress points in various geographic locations and through various provider edge devices or other edge devices. In other examples, border network 204 and border network 224 may be separately-managed border networks with different AS identifiers. For the present disclosure, the border networks 204, 224 are considered to include the same AS identifier such that, for routing purposes, border network 204 and border network 224 may be considered as part of the same border network or client.

The connections between the border network 204, 224 and the network 202 provide multiple routes between the border network and the telecommunications network 202 along which communications or packets may be transmitted. It should be appreciated, however, that the border network 204, 224 may connect to the network 202 through any number of edge devices in any geographic locations (known as "gateways") in which the telecommunications network is present. For example, the customer network 204, 224 may connect to a first provider edge 210 located in San Francisco, Calif., and a second provide edge 216 located in Dallas, Tex. In still other examples, the border network 204 may include multiple connections to the network 202 in a single gateway. Thus, the border network 204 may connect to the network 202 in San Francisco through both provider edge C 210 and provider edge D 212. Each provider edge device of the telecommunications network 202 may communicate with a similar provider edge device of the border network 204, 224 to transmit and receive communication packets between the networks. In this manner, a border network 204, 224 may connect to the telecommunications network 202 through multiple connections in multiple locations.

In one particular configuration, the network 202 may include a route reflector device or server 209. In general, the route reflector 209 is a server or other type of networking device that receives an announced route from a telecommunications device and broadcasts the received route to other devices in the network 202. As utilized in the network 202 of FIG. 2, the route reflector 209 receives routes announced from provider edges 210-218 and broadcasts the received routes to other provider edges, servers, media gateways, etc. of the network 202. The use of the route reflector 209 in the network 202 removes the need for each device of the network to communicate its announced route to each of the other devices in the network. Rather, the route reflector 209 announces each received route to each other devices itself so that each device in the network is not tasked with announcing routes to each other device, thereby reducing processing load on individual devices and overall traffic on the network 202 to exchange routing information.

In one particular embodiment, the route that is received and broadcast by the route reflector 209 is a border gateway protocol (BGP) route announced by the transmitting provider edge 210-218. In general, BGP information (or BGP session, BGP feed or BGP data) is a table of Internet Protocol (IP) prefixes which designate network connectivity between autonomous systems (AS) or separate networks. BGP information for a network route may include path (including next-hop information), network policies and/or rule-sets for transmission along the path, among other information. The BGP feed may also include Interior Gateway Protocol (IGP) information for network routes within an AS or network and/or other network information that pertains to the transmission of content from the network. However, as described below, BGP information mainly describes routes used by the network 202 to connect to external networks or customers (such as border networks 204, 224) while IGP information describes routes through the network to connect one provider edge (such as provider edge E 216) to another provider edge (such as provider edge C 210) through a telecommunications network.

One or more of the components of the network 202 may announce, through a BGP session, routes serviced by that component. For example, PE-C 210 may provide a BGP announcement that indicates which networks (such as border network 204) that may be accessed through PE-C. Thus, the BGP announcement for PE-C 210 may include a path and next-hop information that designates a path along which packets may be transmitted or received from the connected networks (such as border network 204). The next-hop information generally identifies a particular device of the network 202 through which a destination device or address is available. For example, a particular Internet Protocol (IP) address associated with a customer of the network 202 or border network 204 that is accessible through the border network may be announced from PE-A 206 of the border network to PE-C 210 of the telecommunications network 202. PE-A 206 may receive the customer IP address from the customer itself as provided to the border network 204 or the address may be provided to by the border network. Regardless of the origination of the customer IP address, PE-C 210 receives the address and broadcasts the address to the network 202 to indicate that communication packets intended for that IP address or destination device may be processed through PE-A 206 to reach the intended destination.

In some instances, separate border networks may connect to the telecommunications network 202 through the same edge device. For example, other border networks in addition to the border network 204 illustrated may connect to the network 202 through PE-C 210. In such a circumstance, the BGP announcement from PE-C 210 may include routing information for both border networks. Regardless of the number of border networks available behind the edge devices 210-218 of the network 202, the BGP announcements from the provider edges to the route reflector 214 are re-broadcast to other components of the network 202 such that each component of the network 202 may become aware of the egress ports available for customers or networks connected to the network 202 and how to route packets intended for those connected networks.

As mentioned above, Border Gateway Protocol (BGP) is the routing protocol used to distribute routes/prefixes between various networks. External BGP (eBGP) announcements are used to exchange routing between networks with separate AS indicators and internal BGP (iBGP) announcements are used to announce routes internally within a network. Typically, an eBGP session is established between two edge or border devices in different networks (such as PE-A 206 of border network 204 and PE-C 210 of network 202) and routes/prefixes are exchanged over the eBGP session. For eBGP learned prefixes, the receiving edge device sets a next hop address accompanying the announced route to either the physical IP address or Loopback address (eBGP Multi-hop) of the eBGP neighbor. In many cases, there may be multiple connection points between two networks (such as border network 204, 224 connecting through PE-C 210 and through PE-E 216) which optimizes traffic, scales the networks, and provides geographic redundancy.

When routes are advertised internally (iBGP) within a network, the next hop address of the advertising eBGP border network device (PE-A 206 in this example) is advertised to all routers in the network 202 to allow the routers to resolve the next hop address. One simple approach is to advertise all routes inside a network with Next-Hop Self (NHS) set to the originating border device 206. When prefixes are advertised with the NHS value, the network 202 routers rely on recursion on the next-hop to route traffic to the proper edge device 206 for delivery to the destination device. That is, next-hop values associated with BGP prefixes are resolved via the Internal Gateway Protocol (IGP).

Once BGP information is received at a router of the network 202, the router may execute a selection process to determine which route to utilize to route a received communication packet to a destination device or address. In one embodiment, the route selection process executed by the router or other network device selects the best BGP path for reaching a destination. Once the route is selected, the router will recurse on the next-hop address in the IGP to determine how to route traffic to the next-hop-address. In the event that a network router receives two prefixes with identical attributes or network costs in transmitting a packet along a particular route, the best path will be selected with the lowest associated cost, as discussed in more detail below.

For example, many networks utilize route reflector devices 209 for re-broadcasting received routes to external networks or customers. Such route reflectors 209 are often configured to only broadcast a preferred or "best" route to other devices in the network 202 for customers to the network that have several egress routing paths. This acts to force all traffic from the network to the customer on one preferred route, potentially overloading that route when other open routes are also available. However, the best route is often selected as being the lowest cost to the network 202 in terms of network usage or providing the highest performance to the receiving device. Thus, the network congestion savings or customer experience for utilizing the selected route often may outweigh the potential for overloading of the selected and advertised route. In another example, a failure at a border network, customer network, or network device may cause connecting network devices to broadcast alternate routing information. In particular, if PE-G 220 were to fail for any reason, border network 224 may rebroadcast a route through PE-H 222 as a backup route to reach the border network. This alternate routing may cause the route reflector 209 to re-calculate the best path through the network 202 and re-broadcast the new routing information to the network devices. However, changes to the routing information may take a significant amount of time and processing power, during which communications intended for a destination network or address may be lost or otherwise dropped by the network 202.

As described, networks 202 that include a route reflector 209 device may calculate a best path or route and provide that route to the routing devices of the network 202. In particular, when a border network 204, 224 to the network 202 has a single access route or port to/from the network, the route reflector 209 announces the received BGP routing information for the single access route. However, in some circumstances, a border network has multiple connections to the network 202. In the example illustrated in FIG. 2, route reflector 209 receives BGP routing information for border network 204, 224 from PE-C 210, PE-D 212, PE-E 216, and PE-F 218 as that particular border network is connected to the network 202 through each of the illustrated edge devices. In other words, packets or communications intended for border network 204, 224 may be transmitted through any of noted edge devices. However, some route reflectors 209 may be configured to only repeat or broadcast a single route when several possible routes for a destination network or device are received at the route reflector. For example, the route reflector 209 of FIG. 2 may select PE-C 210 as the best route to reach border network 204, 224 based on any number of cost metrics calculated or determined by the route reflector. In particular, the route reflector 209 may be configured to select a "best path" based on network metrics and broadcast the single "best path" to other network devices or routers in the network 202. Thus, each device in the network 202 may only receive a single routing path through one of the possible multiple egress routes to the particular border network 204, 224. As such, traffic for a customer network connected to the telecommunications network 202 may be limited to egress the network through a selected or determined "best path" or selected provider edge, reducing the potential network performance gained through multiple connections to the network.

Regardless of whether the best path, and in particular an egress device of the network 202, to reach a destination address or device is provided by a route reflector 209 or calculated by a network device, the next-hop value included in the BGP information broadcast through the network includes a Next-Hop Self (NHS) value that identifies a particular edge device for reaching the destination address. Thus, only one route is typically broadcast to reach the destination address such that all traffic intended for the destination is processed through a single egress location. Further, in some instances a failure may occur along the route (such as at the border network 204, 224 or at a customer site) that prevents packets for the destination from being terminated at the destination address. Such failures may be detected at the network through a BGP session failure, such as a session failure between PE-A 206 of border network 204 and PE-C 210 of the telecommunications network 202. In such circumstances, the selected edge device (PE-C 210) withdraws the prefixes in the BGP information transmitted to the route reflector 209 (or to other devices of the network 202) which causes the route reflector to perform the BGP "best path" route selection algorithm again and update/advertise these prefixes to the routers of the network. Depending on the size of the network, quantity of the prefixes, and the number of clients of the route reflector 209, this process may be a time consuming event during which communication packets intended for the destination are transmitted to a "black hole" along the route and ultimately lost. In networks without a route reflector device 209, a BGP Next-Hop change causes each router to perform the BGP route selection process and to re-calculate a new best path for each prefix, which may also take a significant amount of time to converge the network into a route to reach a destination network or device identified in the BGP information.

Figure 3:
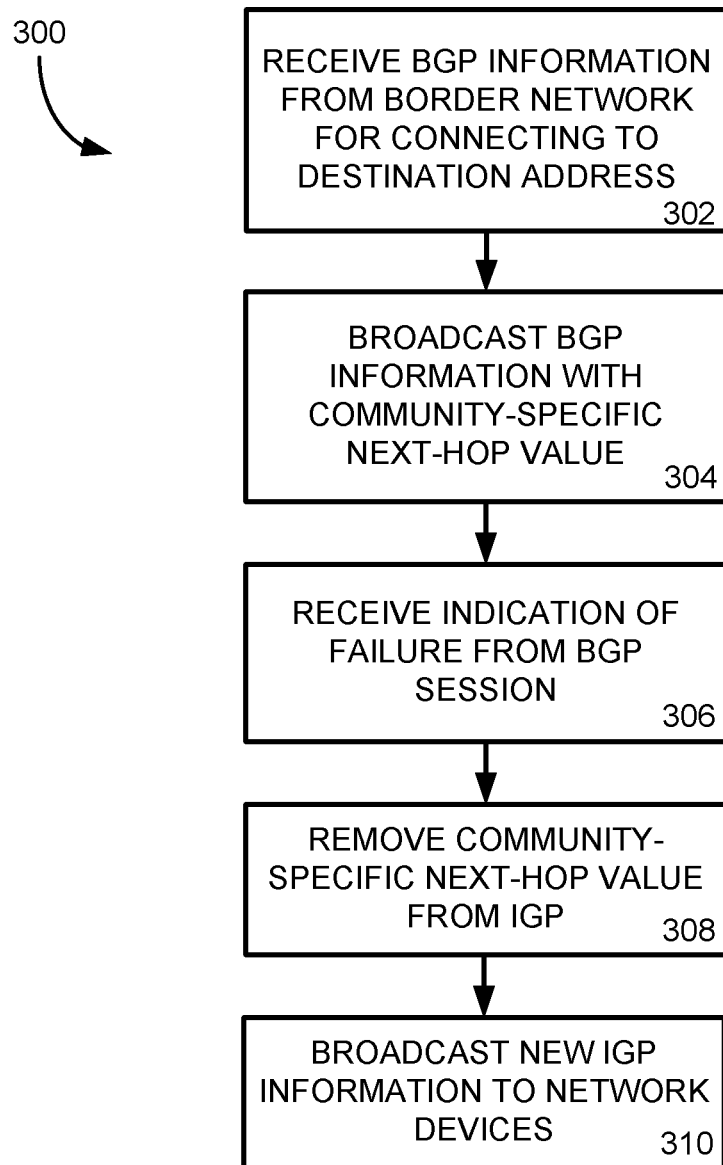
FIG. 3 is a flowchart illustrating a method for a provider edge of a telecommunications network to broadcast border gateway protocol (BGP) with a group-specific next-hop value.

Through the best path routing described above, telecommunications network 202 may not leverage the ability for border networks 204, 224 to connect to the network in multiple locations or ingress points. Further, changes made to the routing tables due to a failure at a destination device or other point along a route may cause significant issues in routing packets to the intended destination. Thus, presented herein are methods and systems to route communication packets in a network 202 utilizing community Next-Hop values in announced BGP routes. This Next-Hop Anycast-type routing may provide a simple and flexible routing procedure to load balance among the multiple connections to a border network 204, 224, as well as providing fast converging changes to the routing tables based on a failure along a selected or preferred route. In particular, FIG. 3 is a flowchart illustrating a method 300 for an edge device of a telecommunications network 202 to broadcast border gateway protocol (BGP) and interior gateway protocol (IGP) announcements with a community specific Next-Hop value that allows routers within the network to load balance and respond quickly to failures in the network. Through the operations of the method 300 of FIG. 3, the network 202 may provide multiple routes through the network for a particular destination device or address without significantly increasing the number of routes maintained by the components of the network. In addition, the method 300 allows for devices within the network 202 to load balance among many possible routes of the network to reach the destination address or device, thereby reducing the load on any one particular route to the destination.

Beginning in operation 302, the edge device to the network 202 (PE-C 210 in this particular example) receives BGP information from an edge device of a border network (PE-A 206 of border network 204 in this example). The BGP information from PE-A 206 may be received during a BGP session between PE-A and PE-C 210 and includes information for connecting to the border network 204. For example, the BGP information may include an autonomous system (AS) identifier and/or other route path information that the network 202 may utilize to determine which route to transmit packets or communications intended for a destination address accessible through the border network 204. Upon receiving the BGP information, PE-C 210 may add next-hop information to the received BGP information and broadcast the amended BGP information to other components of the network 202, such as route reflector 209. In general, PE-C 210 provides BGP information to the route reflector 209 through a BGP session between the components. Through this session, PE-C 210 provides BGP information that includes the received route and a next-hop identifier that is associated with PE-C, along with other routing parameters. Thus, in the above example where the route reflector 209 is included in the network 202, each edge device 210-218 of the network connected to the border network 204, 224 would similarly provide routing information to reach the border network through the associated edge devices. The route reflector 209, in turn, would select the "best route" to border network 204, 224 and broadcast to the routers and other networking devices of the network 202 the BGP information of the selected best route, including the next-hop value associated with the selected route. In the embodiment above where the route reflector 209 relays more than one route path or the network 202 doesn't include a route reflector such that each component of the network receives BGP information from each edge device 210-218 of the network, each of the receiving components of the network execute an algorithm similar to that of the route reflector 209 to select the best path to reach the border network 204, 224. Regardless of the network configuration, packets intended for a destination address associated with the border network 204, 224 may be funneled through one edge device of the network 202 if that device is part of the selected best path while other connections to the destination address may go unused by the components of the network 202 to reach the particular border network.

To more efficiently utilize each of the connections to the border network 204, 224 from the network 202, the method 300 of FIG. 3 includes adding a group-specific next-hop value in the announced BGP route in operation 304. For example, each provider edge 210, 212 in a particular gateway location may be programmed or otherwise configured to provide a group-specific next-hop value associated with a gateway into the network 202 and for a particular customer or client of the network 202. One such next-hop value may be an IP address such as 1.1.1.1. However, it should be appreciated that the next-hop value for a particular client or customer network may be any value transferable over a BGP session. For example, the next-hop value may be a community value associated with a particular customer or destination device or a community value for a particular customer in a particular gateway or location of the network 202. Such next-hop values may be different than the gateway specific next-hop value, such as IP address 1.1.1.2. In this manner, a customer connecting to the network 202 in San Francisco may have a first next-hop value associated with San Francisco gateway to the network and may have a different next-hop value associated for other connections to the network 202 in other areas or locations of the network, such as a second next-hop value associated with a Dallas gateway to the network.

With the group-specific next-hop value attached, each provider edge 210-218 of the network 202 transmits the BGP route information received from the border network 204, 224 to the route reflector 209 in operation 304, or alternatively broadcasts the BGP information to the other components of the network 202. Thus, PE-C 210, PE-D 212, PE-E 216, and PE-F 218 would provide BGP route information that includes the received route and the group-specific next-hop value to the route reflector 209. Further, each provider edge 210-218 transmitting the BGP route is configured to provide packets or communications from the network 202 that utilize the group-specific next-hop value to the border network 204, 224 associated with community next-hop value.

In some instances, the route reflector 209 relays the received BGP route information to other components in the network 202. However, because the routing information received from each of the PEs 210-218 connected to border network 204, 224 includes the same group-specific next-hop value, the components of the network 202 now have multiple paths in their routing table to reach the destination device or address. In other words, the routers of the network 202 may utilize any received route that includes the group-specific next-hop value to reach a destination address, allowing the devices to load balance among the multiple routes (assuming a similar or identical calculated cost to utilize the individual routes) and to quickly failover packets from a dropped connection to an active connection to the destination. Thus, the route reflector 209 does not select the best path to reach the border network 204, 224 and only broadcasts that route. Rather, the route reflector 209 broadcasts each received route with the group-specific next-hop value to the components of the network 202 and each component may then determine which route to the border network 204, 224 to use for any particular received communication.

The group-specific next-hop value (also known as next-hop Anycast) provides a simple, flexible, and extensible load sharing and fast converging enhancement for BGP routing within the network 202. In general, the community next-hop value may be based on any type of community of addresses or devices of the network 202. In one particular example, a next-hop gateway (NHG) value may be used to share a next-hop value among the edge devices of a particular gateway to the network 202. Thus, every egress route to the border network 204, 224 from a particular gateway (typically based on a geographical location of the gateway) may have the NHG applied to BGP announcements. In another example, a next-hop peer (NHP) value may be used to share a next-hop value among the edge devices that connect to a particular customer of the network 202. In yet another example, a next-hop peer locality (NHL) value may be used to share a next-hop value among the edge devices that connect to a particular customer of the network 202 in one or more particular locations of the network 202. Although these three particular uses are described herein, it should be appreciated that the community that shares the next-hop value may be any type of community of the network 202 and may include any number of edge or other networking devices or any number of egress routes to a destination network or customer.

For the next-hop gateway (NHG) embodiment discussed above, two or more edge devices in the same gateway may broadcast BGP information that includes the same NHG value. More particularly, two or more edge devices that are connected to (or otherwise receive BGP announcements from) the same border network 204 and are located in the same gateway (or same geographical location) may utilize the NHG value in a similar manner as described above. For example and turning to the network 200 of FIG. 2, PE-C 210 and PE-D 212 may both be located in a gateway located in San Francisco and connect to border network 204 through PE-A 206 and PE-B 208, respectively. Although the gateway is defined here as being within the same location or metro area, it should be appreciated that a gateway to the network 202 may be defined to include any number of devices located in any geographic location of the network footprint. Generally, however, a gateway includes edge devices that are physically near each other.

Rather than utilizing a next-hop self value that identifies the particular edge device broadcasting the BGP information, PE-C 210 and PE-D 212 may insert a NHG value that is the same for the two edge devices into the iBGP session announcements. In one particular embodiment, each prefix that advertised with an NHG is tagged with a BGP "community" that identifies it as a NHG prefix. The NHG is configured on the edge device and advertised internally over iBGP sessions to the components of the network 202, such as the route reflector 209 or other networking devices. Thus, the networking components of the network 202 may receive multiple routes for a particular destination address that include the same NHG value. This unique NHG value for the customer through a particular gateway allows the networking devices of the network 202 to determine a shortest path to the destination address and transmit packets along the selected route. However, because each edge device 210, 212 is located in the same gateway, the shortest path (or path with the least "cost" to the network) is likely to be the same or similar for either route. The networking device may, in this circumstance, alternate sending packets between the two (or more) paths to the edge devices of the gateway, thereby load balancing the traffic to the destination address between the edge devices 210, 212 of the nearest gateway to the networking device. In this manner, the shared NHG value provides multiple routing paths to reach a destination address for a device of the network 202 over which traffic may be load balanced across, increasing the performance and capacity of the telecommunications network.

In addition, the shared NHG value allows for a failover procedure within the network 202 that reduces routing traffic to a failed or unresponsive border network device 206, 208. In particular and returning to the method 300 of FIG. 3, the edge device 210 may receive an indication of a failure along the route to the destination address in operation 306. This indication may be received during an eBGP session with PE-A 206 in which PE-A ceases to broadcast the availability of the destination address through PE-A (as that link is now no longer functioning). In general, however, the indication may be received for any topology change in the route to the destination address. Upon receiving the indication of the failure, the network edge device 210 may remove the NHG value from the IGP information being broadcast in operation 308 and broadcast new BGP information to the devices within the network 202 that does not include the NHG in operation 310. In other words, the edge device may cease utilizing the NHG value as it pertains to the affected destination address. In response, the components of the network 202 may re-execute the algorithm to determine the shortest or best route to the destination address. However, because the failed route no longer utilizes the NHG, the network components would select a different route to the border network 204 and may begin transmitting traffic for the destination address to one of the remaining routes that does utilize or include the NHG. Large networks that utilize one route (such as a "best route" as determined by the route reflector 209) to a destination address may lose traffic to the border network 204 while the new routing information is broadcast throughout the network 202. Thus, by utilizing the shared NHG value, the failover to the alternate route may occur faster to prevent significant traffic loss to the failed route.

For example, assume PE-C 210 and PE-D 212 of the system 200 of FIG. 2 are in or otherwise are associated with the same gateway of the network 202. Thus, PE-C 210 and PE-D 212 may broadcast BGP information that includes the same NHG value for routes to border network 204, as described above. If PE-A 206 fails, PE-C 210 would cease receiving BGP session information from corresponding PE-A 206 such that PE-C may detect the failure at PE-A. This change in network topology may be transmitted through the network 202, but may take some time, depending on the size of the network. However, because PE-D 212 also announces a route to the destination address (utilizing the NHG value), packets intended for the destination address may be transmitted to PE-D 212 for termination quickly. The use of the NHG value may thus reduce network convergence and brown out times associated with router or other device failures.

In another example, a next-hop peer (NHP) value may be used for each connection between the network 202 and a particular border network 204, 224. For example, border network 204, 224 may connect to network 202 in several locations, such as through PE-C 210 and PE-D 212 in San Francisco and through PE-E 216 and PE-F 218 in Dallas. However, border network 204, 224 may be the same network identified by the same AS identifier (i.e., controlled by the same administrator or entity and identifiable to the telecommunications network 102 as the same network based on providing the same AS value in BGP sessions between the border network and the telecommunications network). In this example, each edge device 210-218 of the network 202 that connects to a particular border network 204, 224 may utilize a unique NHP value when broadcasting routing information to the other components of the network. The use of the advertised routes by the components of the network 202 occurs as described above. In particular, each component (or a route reflector 209 component) determines which received route is the shortest or best path and utilizes that route to transmit traffic to the destination address, while also load balancing between routes that have identical or similar costs. For example, routers of the network 202 that are near San Francisco may load balance between PE-C 210 and PE-D 212 to reach border network 204, but would not transmit traffic to PE-E 216 in Dallas as long as the routes through San Francisco remain active. In one particular implementation, the border network 204, 224 would advertise the NHP value rather than have it assigned by the edge device 210-218 of the network 202. The NHP value may be provided by the network 202 or a network administrator to the border network 204, 224 for announcing during eBGP sessions between the networks.

A failover procedure may also be provided through the use of the NHP value. For example, edge devices 210-218 of the network 202 may utilize the same NHP value as discussed above. If PE-A 206 fails, PE-C 210 would cease receiving BGP session information such that PE-C may detect the failure at PE-A. This change in network topology may be transmitted through the network 202 to reroute traffic for the intended address. However, because PE-E 216 in Dallas also announces a route to the destination address (utilizing the NHP value), packets intended for the destination address may be transmitted to PE-E 216 for termination. This may aid in providing a robust network for a customer as the customer may only experience a failure or outage in a particular location, such as San Francisco. Rather than losing all traffic from the network 202, communication packets may be re-directed through another connection to the network. This may be especially helpful when the supporting network (border network 204, 224) remains active, but one or more of the customer devices go into a failure state. By quickly re-directing traffic to an active portion of the customer network, less traffic may be lost due to the failure at the customer's devices.

In yet another example, a local next-hop peer (NHL) value may be used for each connection between the network 202 and a particular border network 204, 224 in particular locations. For example, many customers or border networks 204, 224 have traffic engineering requirements or criteria that route traffic with specific prefixes to a specific set of edge devices of the border network, such as when a particular application (for example, web services) is available only from application servers in a particular geographic location. Thus, the customer may prefer to have all traffic intended for the particular application provided to the border network 204, 224 in the same particular geographic location. In general, any traffic engineering considerations of the customer may lead to the use of the NHL value. In this circumstance, the NHL value may allow the routing of traffic to a border network 204, 224 through a subset of connection points between the border network and the telecommunications network 202.

Utilizing the network 200 of FIG. 2 as an example of the use of an NHL value, assume that border network 204, 224 connects to network 202 in several locations, such as through PE-C 210 and PE-D 212 in San Francisco and through PE-E 216 and PE-F 218 in Dallas. However, the border network (or a connected customer to the border network) may intend for all traffic to a specific destination address be transmitted through the Dallas located edge devices PE-E 216 and PE-F 218 and not through PE-C 210 or PE-D 212. In this example, the edge devices 216-218 of the network 202 that connects to the border network 204, 224 in Dallas may utilize an NHL value when broadcasting routing information into the network. In addition, the border network 204, 224 may utilize a different next-hop value, such as the customer-specific NHP discussed above, to advertise customer destinations for other connections between the border network and the telecommunications network 202 (in this example, through PE-C 210 or PE-D 212). Thus, two different next-hop values may be used by the border network 204, 224 for connection to a customer, such as a global NHP value and a local NHL value for traffic intended for a specific destination address.

Similar to above, each component (or a route reflector 209 component) of the network 202 determines which received route is the shortest or best path and utilizes that route to transmit traffic to the destination address, while also load balancing between routes that have identical or similar costs. Thus, routers of the network 202 near San Francisco may continue to provide general traffic to the customer through the nearby edge devices 210-212 in San Francisco based on the advertised NHP value. However, for traffic intended for a specific application or destination address of the customers, the routers may rely on the NHL value and send traffic through the Dallas-based edge devices 216-218. The application-specific traffic may be load balanced between edge devices 216-218 as described above, as well as providing a failover option for failures along a route to the customer. Although described as being in the same location, it is not necessary that the edge devices utilizing the NHL value be near each other. Rather, any connection point between the border network 204, 224 and the telecommunications network 202 may utilize the NHL value. The NHL value thus operates to create a subset of connection points to the destination customer through which specific traffic may be steered in response to traffic engineering considerations of the border network or customer to the network.

Figure 4:
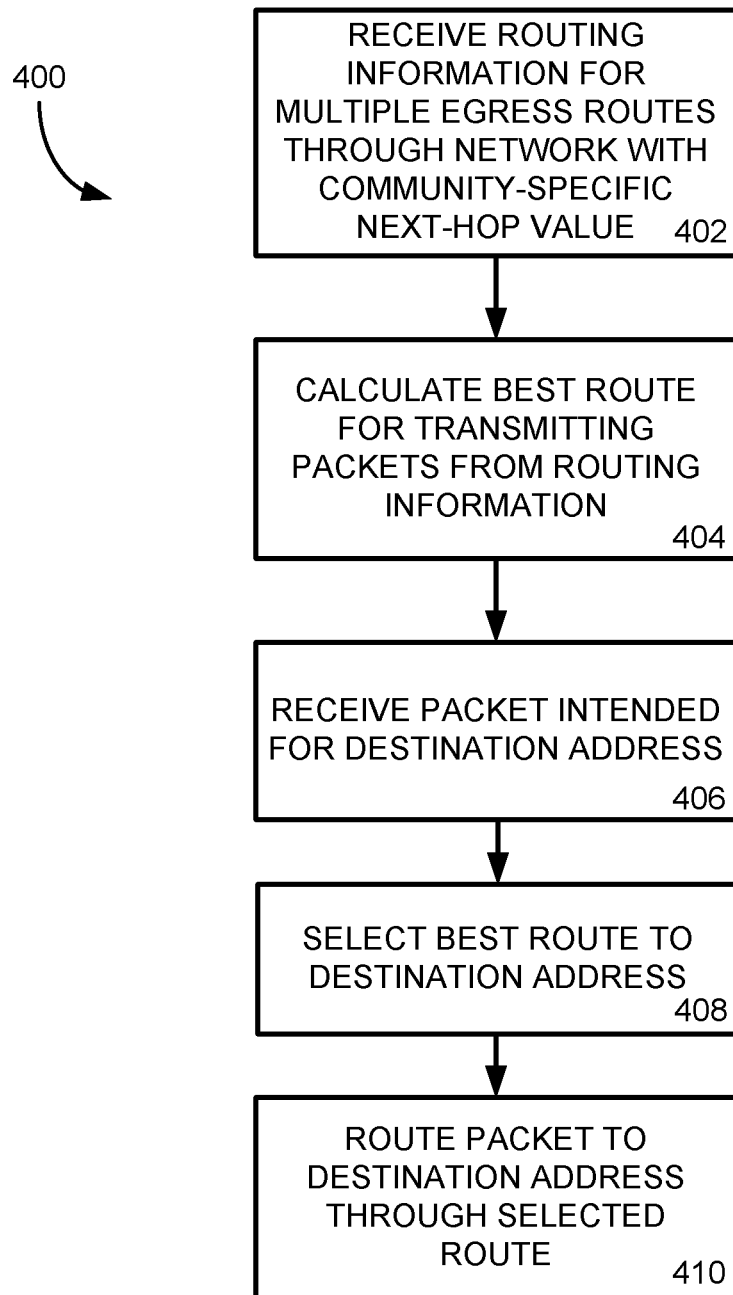
FIG. 4 is a flowchart illustrating a method for component of a telecommunications network to transmit a packet to a customer network based on a group-specific next-hop value in broadcast BGP information.

FIG. 4 is a flowchart illustrating a method 400 for a networking device, such as a router, of a telecommunications network 202 to transmit a packet to a customer network 204 based on a customer-specific value as a next-hop value. The operations of the method 400 may be performed by a router or any other component of the network in response to receiving a packet or communication intended for a destination address. Such a communication may be provided by a component within the network 202 (such as a content server) or from a telecommunications device external to the network (such as a content server of a provider network).

Beginning in operation 402, the router receives a BGP announcement that includes multiple egress routes to a customer network that includes the group-specific next-hop value as described above. In one example, the BGP route information is received at router from route reflector 209 as announced from an edge device connected to a border network 204, 224. The router may store or otherwise maintain the received BGP route with the community-specific next-hop value for routing of communications to the customer network.

In operation 404, the router may select a preferred route through the network 202 from the multiple egress routes known to the border network 204, 224. For example, through the received information, router may be aware of four egress points from the network 202 to the border network 204, 224, namely PE-C 210, PE-D 212, PE-E 216, and PE-F 218, based on each of the edge devices advertising routes with the group-specific next-hop value. Thus, the router selects one of the multiple routes to the border network 204, 224 to transmit a received packet. In one embodiment, the router may select a "best route" based on any type of network performance metric and transmit the packet along the selected route. In another embodiment, the router may load balance among the known egress points to the border network 204, 224 and may select the egress route accordingly The router receives a packet or communication intended for the border network 204, 224 in operation 406. As mentioned, the packet may include routing information that identifies the destination address and/or a next-hop value associated with the border network 204, 224. In operation 408, the router selects the determined best route through the network 202 from the multiple egress routes known to the border network 204, 224 and, in operation 410, routes the received packet to the border network along the selected route.

Figure 5:
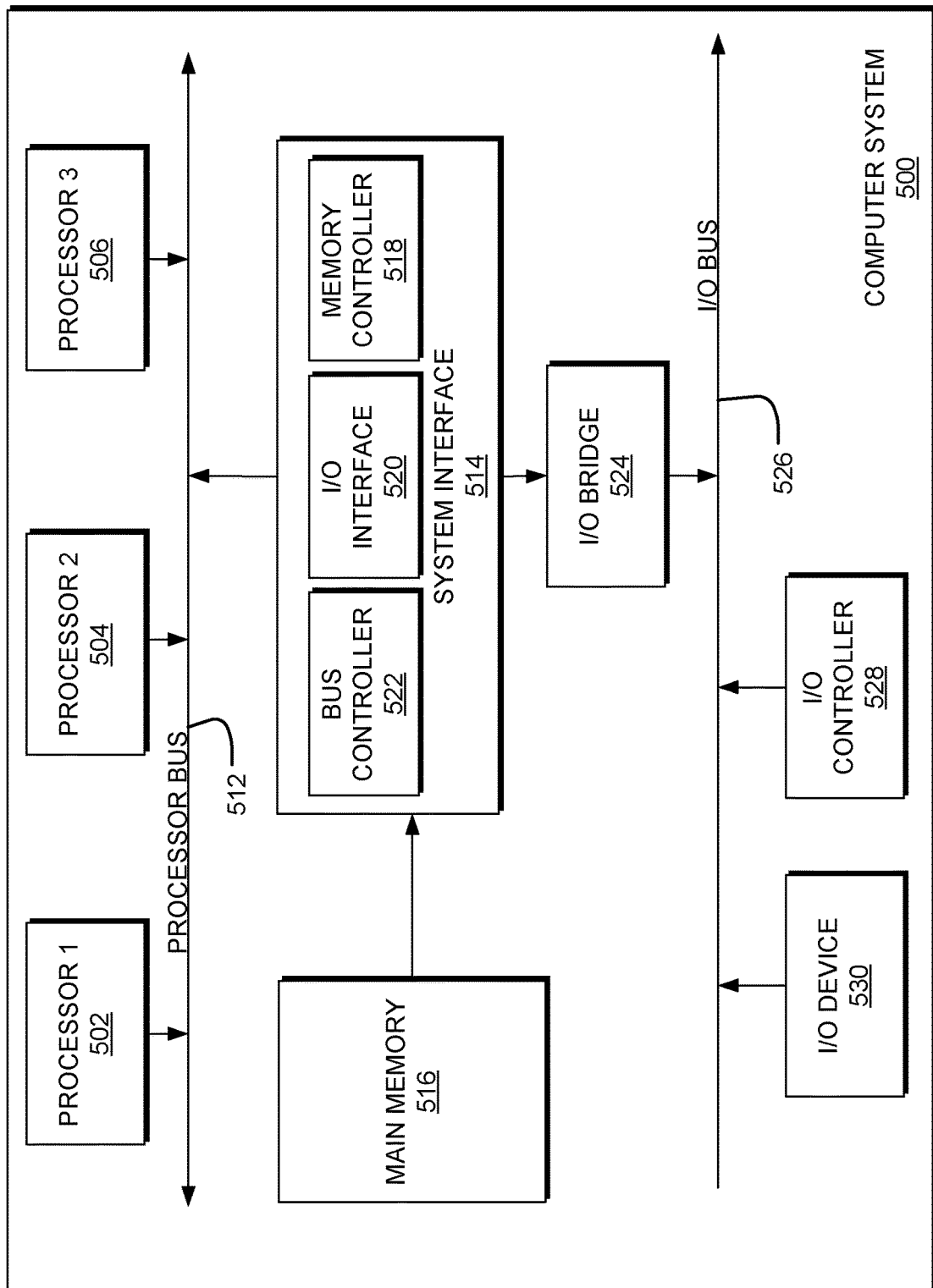
FIG. 5 is a diagram illustrating an example of a computing system which may be used in implementing embodiments of the present disclosure.

FIG. 5 is a block diagram illustrating an example of a computing device or computer system 500 which may be used in implementing the embodiments of the components of the network disclosed above. For example, the computing system 500 of FIG. 5 may be the edge device discussed above. The computer system (system) includes one or more processors 502-506. Processors 502-506 may include one or more internal levels of cache (not shown) and a bus controller or bus interface unit to direct interaction with the processor bus 512. Processor bus 512, also known as the host bus or the front side bus, may be used to couple the processors 502-506 with the system interface 514. System interface 514 may be connected to the processor bus 512 to interface other components of the system 500 with the processor bus 512. For example, system interface 514 may include a memory controller 514 for interfacing a main memory 516 with the processor bus 512. The main memory 516 typically includes one or more memory cards and a control circuit (not shown). System interface 514 may also include an input/output (I/O) interface 520 to interface one or more I/O bridges or I/O devices with the processor bus 512. One or more I/O controllers and/or I/O devices may be connected with the I/O bus 526, such as I/O controller 528 and I/O device 540, as illustrated.

I/O device 540 may also include an input device (not shown), such as an alphanumeric input device, including alphanumeric and other keys for communicating information and/or command selections to the processors 502-506. Another type of user input device includes cursor control, such as a mouse, a trackball, or cursor direction keys for communicating direction information and command selections to the processors 502-506 and for controlling cursor movement on the display device.

System 500 may include a dynamic storage device, referred to as main memory 516, or a random access memory (RAM) or other computer-readable devices coupled to the processor bus 512 for storing information and instructions to be executed by the processors 502-506. Main memory 516 also may be used for storing temporary variables or other intermediate information during execution of instructions by the processors 502-506. System 500 may include a read only memory (ROM) and/or other static storage device coupled to the processor bus 512 for storing static information and instructions for the processors 502-506. The system set forth in FIG. 5 is but one possible example of a computer system that may employ or be configured in accordance with aspects of the present disclosure.

According to one embodiment, the above techniques may be performed by computer system 500 in response to processor 504 executing one or more sequences of one or more instructions contained in main memory 516. These instructions may be read into main memory 516 from another machine-readable medium, such as a storage device. Execution of the sequences of instructions contained in main memory 516 may cause processors 502-506 to perform the process steps described herein. In alternative embodiments, circuitry may be used in place of or in combination with the software instructions. Thus, embodiments of the present disclosure may include both hardware and software components.

A machine readable medium includes any mechanism for storing or transmitting information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 516. Common forms of machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

Embodiments of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations together with all equivalents thereof.

We claim:

1. A telecommunications network comprising:
a first network edge device;
a second network edge device; and
a border network in communication with a telecommunications network, wherein
the first network edge device establishes a border gateway protocol (BGP) session with a first edge device of the border network, the BGP session providing first routing information for transmitting communication packets through the first network edge device of the border network,
the second network edge device receives second routing information from a second edge device of the border network, the second routing information for transmitting communication packets through the second network edge device of the border network, and
the first network edge device and second network edge device transmit internal BGP information to at least one device of the telecommunications network, the internal BGP information comprising a group-specific next-hop identifier.

2. The telecommunications network of claim 1, wherein the first network edge device and the second network edge device are located in the same gateway of the telecommunications network.

3. The telecommunications network of claim 1, wherein the group-specific next-hop identifier is a next-hop peer identifier and the first network edge device and the second network edge device are connected to the border network in different geographical locations, the border network associated with a particular autonomous system (AS) number border network of the telecommunications network.

4. The telecommunications network of claim 3, further comprising:
a third network edge device receiving third routing information from a third edge device of the border network in communication with the telecommunications network, wherein
the third network edge device transmits internal BGP information to the at least one device of the telecommunications network comprising a next-hop peer local identifier, the next-hop peer local identifier different than the next-hop peer identifier and based at least on a customer network configuration.

5. The telecommunications network of claim 1, wherein the at least one device of the telecommunications network receiving the internal BGP information is a route reflector networking device.

6. The telecommunications network of claim 1, wherein
an indication of a failure of the first edge device of the border network in communication with the telecommunications network is received, and
the communication packets are transmitted to a destination address through the second network edge device of the border network in response to the indication of the failure of the first edge device of the border network.

7. The telecommunications network of claim 1, wherein
a first portion of the communication packets are transmitted to a destination address through the first network edge device of the telecommunications network, and
a second portion of the communication packets are transmitted to the destination address through the second network edge device of the telecommunications network to load balance the communication packets between the first network edge device and the second network edge device.

8. The telecommunications network of claim 2, wherein the gateway comprises networking devices from two or more customers of the telecommunications network.

9. The telecommunications network of claim 1, wherein the at least one device of the telecommunications network utilizes the group-specific next-hop identifier received from the first network edge device and the second network edge device to calculate an optimal route through the telecommunications network to a destination address.

10. The telecommunications network of claim 1, wherein the group-specific next-hop identifier is utilized by the telecommunications network to transmit communication packets to the border network.

11. A networking device comprising: at least one communication port for receiving routing information associated with a telecommunications network; a processing device; and a computer-readable medium connected to the processing device configured to store information and instructions that, when executed by the processing device, performs the operations of:
establishing, utilizing a first network edge device, a border gateway protocol (BGP) session with a first edge device of a border network in communication with a telecommunications network, the BGP session providing first routing information for transmitting communication packets through the first network edge device of the border network;
receiving, utilizing a second network edge device, second routing information from a second edge device of the border network in communication with the telecommunications network, the second routing information for transmitting communication packets through the second network edge device of the border network; and
transmitting internal BGP information from the first network edge device and the second network edge device to at least one device of the telecommunications network, the internal BGP information comprising a group-specific next-hop identifier.

12. The networking device of claim 11, wherein the first network edge device and the second network edge device are located in the same gateway of the telecommunications network.

13. The networking device of claim 11, wherein the group-specific next-hop identifier is a next-hop peer identifier and the first network edge device and the second network edge device are connected to the border network in different geographical locations, the border network associated with a particular autonomous system (AS) number border network of the telecommunications network.

14. The networking device of claim 13, wherein the information and instructions, when executed by the processing device, further perform the operations of:
receiving, utilizing a third network edge device, third routing information from a third edge device of the border network in communication with the telecommunications network;
transmitting internal BGP information from the third network edge device to the at least one device of the telecommunications network comprising a next-hop peer local identifier, the next-hop peer local identifier different than the next-hop peer identifier and based at least on a customer network configuration.

15. The networking device of claim 11, wherein the at least one device of the telecommunications network receiving the internal BGP information is a route reflector networking device.

16. The networking device of claim 11, wherein the information and instructions, when executed by the processing device, further perform the operations of:
receiving an indication of a failure of the first edge device of the border network in communication with the telecommunications network; and
transmitting the communication packets to a destination address through the second network edge device of the border network in response to the indication of the failure of the first edge device of the border network.

17. The networking device of claim 11, wherein the information and instructions, when executed by the processing device, further perform the operations of:
transmitting a first portion of the communication packets to a destination address through the first network edge device of the telecommunications network; and
transmitting a second portion of the communication packets to the destination address through the second network edge device of the telecommunications network to load balance the communication packets between the first network edge device and the second network edge device.

18. The networking device of claim 12, wherein the gateway comprises networking devices from two or more customers of the telecommunications network.

19. The networking device of claim 11, wherein the at least one device of the telecommunications network utilizes the group-specific next-hop identifier received from the first network edge device and the second network edge device to calculate an optimal route through the telecommunications network to destination address.

20. The networking device of claim 11, wherein the group-specific next-hop identifier is utilized by the telecommunications network to transmit communication packets to the border network.

* * * * *